US012447183B2

(12) United States Patent
Biffi et al.

(10) Patent No.: US 12,447,183 B2
(45) Date of Patent: Oct. 21, 2025

(54) BACTERIAL STRAINS, THEIR COMPOSITIONS AND THEIR USE FOR THE TREATMENT OF GASTROINTESTINAL DISORDERS

(71) Applicant: ALFASIGMA S.P.A., Bologna (IT)

(72) Inventors: Andrea Biffi, Trezzano Rosa (IT); Walter Fiore, Trezzano Rosa (IT)

(73) Assignee: ALFASIGMA S.P.A., Bologna (IT)

( * ) Notice: Subject to any disclaimer, the term of this patent is extended or adjusted under 35 U.S.C. 154(b) by 687 days.

(21) Appl. No.: 17/761,980

(22) PCT Filed: Sep. 21, 2020

(86) PCT No.: PCT/IB2020/058769

§ 371 (c)(1),
(2) Date: Mar. 18, 2022

(87) PCT Pub. No.: WO2021/053636

PCT Pub. Date: Mar. 25, 2021

(65) Prior Publication Data

US 2022/0339216 A1 Oct. 27, 2022

(30) Foreign Application Priority Data

Sep. 20, 2019 (IT) ........................ 102019000016811

(51) Int. Cl.
*A61K 35/745* (2015.01)
*A61K 35/747* (2015.01)
*A61P 1/00* (2006.01)

(52) U.S. Cl.
CPC .......... *A61K 35/745* (2013.01); *A61K 35/747* (2013.01); *A61P 1/00* (2018.01)

(58) Field of Classification Search
CPC ........ A61K 35/745; A61K 35/747; A61P 1/00
See application file for complete search history.

(56) References Cited

PUBLICATIONS

Le Noci V, et al. Modulation of Pulmonary Microbiota by Antibiotic or Probiotic Aerosol Therapy: A Strategy to Promote Immunosurveillance against Lung Metastases. Cell Rep. Sep. 25, 2018;24(13):3528-3538. doi: 10.1016/j.celrep.2018.08.090. PMID: 30257213. (Year: 2018).*

Grundmann O, Yoon SL. Irritable bowel syndrome: epidemiology, diagnosis and treatment: an update for health-care practitioners. J Gastroenterol Hepatol. Apr. 2010;25(4):691-9. doi: 10.1111/j.1440-1746.2009.06120.x. Epub Jan. 13, 2010. PMID: 20074154. (Year: 2010).*

Didari T, Mozaffari S, Nikfar S, Abdollahi M. Effectiveness of probiotics in irritable bowel syndrome: Updated systematic review with meta-analysis. World J Gastroenterol. Mar. 14, 2015;21(10):3072-84. doi: 10.3748/wjg.v21.i10.3072. PMID: 25780308; PMCID: PMC4356930. (Year: 2015).*

Saez-Lara MJ, Gomez-Llorente C, Plaza-Diaz J, Gil A. The role of probiotic lactic acid bacteria and bifidobacteria in the prevention and treatment of inflammatory bowel disease and other related diseases: a systematic review of randomized human clinical trials. Biomed Res Int. 2015;2015:505878. (Year: 2015).*

Korada SK, Yarla NS, Bishayee A, Aliev G, Aruna Lakshmi K, Arunasree MK, Dananajaya BL, Mishra V. Can Probiotics Cure Inflammatory Bowel Diseases? Curr Pharm Des. 2016;22(7):904-17. doi: 10.2174/1381612822666151209153249. PMID: 26648465. (Year: 2016).*

Liu Y, Tran DQ, Rhoads JM. Probiotics in Disease Prevention and Treatment. J Clin Pharmacol. Oct. 2018;58 Suppl 10(Suppl 10):S164-S179. doi: 10.1002/jcph.1121. PMID: 30248200; PMCID: PMC6656559. (Year: 2018).*

Salem AE, Singh R, Ayoub YK, Khairy AM, Mullin GE. The gut microbiome and irritable bowel syndrome: State of art review. Arab J Gastroenterol. Sep. 2018;19(3):136-141. doi: 10.1016/j.ajg.2018.02.008. Epub Jun. 20, 2018. PMID: 29935865. (Year: 2018).*

Goodoory VC, Khasawneh M, Black CJ, Quigley EMM, Moayyedi P, Ford AC. Efficacy of Probiotics in Irritable Bowel Syndrome: Systematic Review and Meta-analysis. Gastroenterology. Nov. 2023;165(5):1206-1218. doi: 10.1053/j.gastro.2023.07.018. Epub Aug. 3, 2023. Erratum in: Gastroenterology. (Year: 2023).*

* cited by examiner

*Primary Examiner* — Melenie L Gordon
*Assistant Examiner* — John Paul Selwanes
(74) *Attorney, Agent, or Firm* — Silvia Salvadori, P.C.; Silvia Salvadori

(57) ABSTRACT

Compositions comprising a mixture comprising the bacterial strain *Bifidobacterium bifidum* MIMBb23sg or BbfIBS01 (DSM 32708), at least one or more bacterial strains selected from group A comprising the strains *B. breve* BbIBS01 (DSM 33231), *B. breve* BbIBS02 (DSM 33232), *B. animalis* subsp. *lactis* BlIBS01 (DSM 33233) and *L. plantarum* LpIBS01 (DSM 33234) and, optionally, at least one further bacterial strain selected from a bacterial strain *L. casei* DG® (CNCM I-1572) and a bacterial strain *L. paracasei* LPC-S01™ (DSM 26760) and related method for the treatment of gastrointestinal diseases, disorders or symptoms, in particular functional gastrointestinal disorders, such as, for example irritable bowel syndrome (IBS) are described.

5 Claims, 1 Drawing Sheet

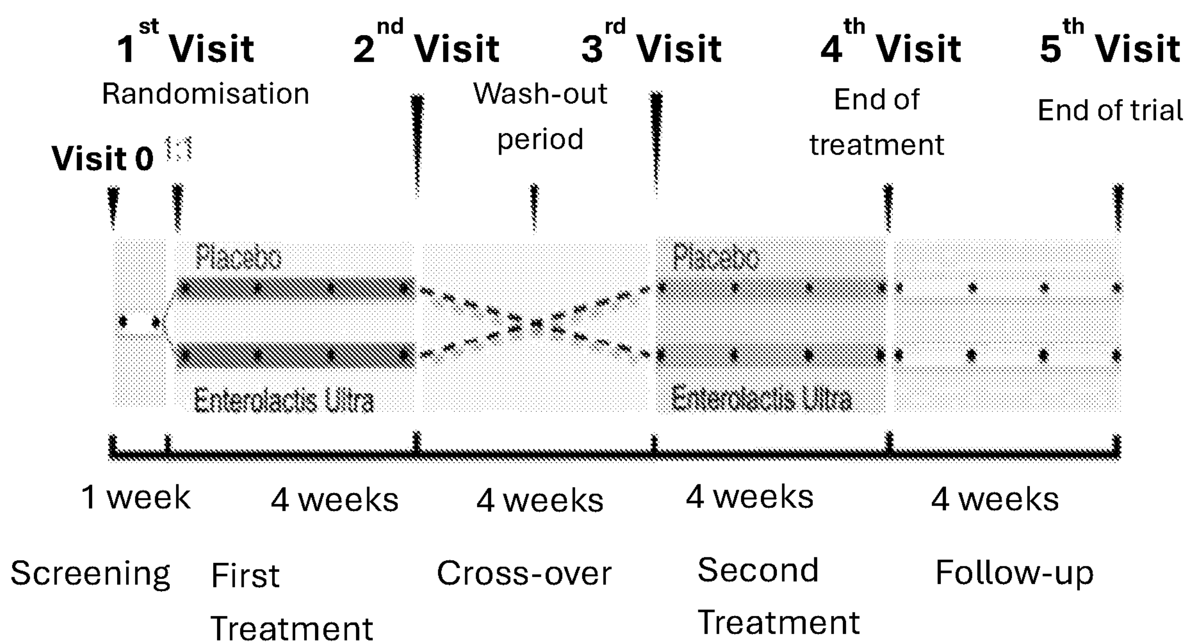
1st Visit
Randomisation
2nd Visit
Wash-out period
3rd Visit
4th Visit
End of treatment
5th Visit
End of trial
Visit 0
1:1
Placebo
Enterolactis Ultra
Placebo
Enterolactis Ultra
1 week
4 weeks
4 weeks
4 weeks
4 weeks
Screening
First Treatment
Cross-over
Second Treatment
Follow-up

BACTERIAL STRAINS, THEIR COMPOSITIONS AND THEIR USE FOR THE TREATMENT OF GASTROINTESTINAL DISORDERS

CROSS-REFERENCE TO RELATED APPLICATIONS

The present application is the U.S. National Stage of International Patent Application No. PCT/IB2020/058769 filed on Sep. 21, 2020 which, in turn, claims priority to Italian Patent Application No. 102019000016811 filed on Sep. 20, 2019.

The present invention relates to novel bacterial strains such as: a strain belonging to the species *Bifidobacterium breve* identified as *Bifidobacterium breve* BbIBS01 (DSM 33231), a strain belonging to the species *Bifidobacterium breve* identified as *Bifidobacterium breve* BbIBS02 (DSM 33232), a strain belonging to the species *Bifidobacterium animalis* identified as *Bifidobacterium animalis* subsp. *lactis* BlIBS01 (DSM 33233) and a strain belonging to the species *Lactobacillus plantarum* identified as *Lactobacillus plantarum* LpIBS01 (DSM 33234).

Furthermore, the present invention relates to compositions comprising a mixture comprising or, alternatively, consisting of: a bacterial strain identified as *Bifidobacterium bifidum* MIMBb23sg or BbfIBS01 (DSM 32708), at least one or more bacterial strains selected from the group comprising or, alternatively, consisting of said *Bifidobacterium breve* BbIBS01 (DSM 33231), *Bifidobacterium breve* BbIBS02 (DSM 33232), *Bifidobacterium animalis* subsp. *lactis* BlIBS01 (DSM 33233) and *Lactobacillus plantarum* LpIBS01 (DSM 33234), and, optionally, at least one further bacterial strain selected from the group comprising or, alternatively, consisting of: *Lactobacillus casei* DG® (CNCM I-1572) and *Lactobacillus paracasei* LPC-S01™ (DSM 26760).

Lastly, the present invention relates to said bacterial strains or mixtures thereof or compositions thereof for use in a method for the preventive and/or curative treatment of gastrointestinal diseases, disorders or symptoms in particular functional gastrointestinal disorders such as, for example, irritable Bowel Syndrome (IBS), and/or inflammatory disorders such as, for example chronic inflammatory bowel diseases (IBD).

Irritable bowel syndrome (in short, IBS) belongs to the group of functional gastrointestinal disorders (FGIDs), a diagnostic category that can be defined based on the symptomatic presentation alone and characterised by the absence of an evident pathogenetic substrate. Gastrointestinal functional disorders (FGIDs), also called gut-brain axis disorders, are a group of disorders classified based on gastrointestinal symptoms related to any combination of: bowel motility disorders, visceral hypersensitivity, altered mucosal and immune function, alteration of the bowel mot microbiota, alteration of the perception of stimuli in the central nervous system. IBS is one of the most common gastrointestinal disorders, affecting about 15-20% of the population, where abdominal discomfort or pain is associated with changes in the intestinal habitat. Although reported in literature, the evident alterations of the lumen or of the gastrointestinal mucosa at the tissue, cell or molecular level are variable events and they have not been irrefutably identified in the IBS. Altered immune responses appear to be involved, but they cannot explain the symptoms entirely. Similarly, an alteration of the gut microbiota (i.e. a dysbiosis) contributes to pathophysiology, but no specific pathogen or pathobiont has yet been reliably related to the IBS.

The irritable bowel syndrome (IBS) is a disorder of the bowel function characterised by abdominal pain related with changes of the in intestinal tract (either constipation-wise or diarrhoeic-wise) and with signs of altered defecation and tympanites. IBS is not to be confused with spastic colitis, given that spastic colitis is an organic disease that arises from the inflammation that causes spasms and abdominal pain. According to Rome IV criteria, IBS is characterised by recurrent abdominal pain, on average, at least 1 day per week in the last 3 months, associated with two or more of the following criteria: related to defecation, associated with a change in the frequency of faeces, associated with a change in the shape (appearance) of faeces. The criteria must be met for the last 3 months, with onset of symptoms at least 6 months prior to diagnosis.

Depending on the characteristics of the faeces, four groups in which patients can be stratified are distinguished: IBS with predominant constipation (constipation), IBS with predominant diarrhoea (diarrhoea), IBS with alternating constipation and diarrhoea, unclassified IBS.

Currently, the therapies available for the treatment of the IBS are aimed at the resolution of the pathogenetic events underlying the IBS. In subjects with diarrhoea, the frequency of bowel movements can be decreased by reducing food intake of short chain carbohydrates which are poorly absorbed in the small intestine (Fodmap) such as fructose, sorbitol and mannitol. It may be useful to combine kaolin-based preparations such as diosmectite with these solutions. Available in subjects predominantly intestinal constipation and with presence of tympanites, are preparations with low concentrations of polyethylene glycols/mineral salts, to be taken daily. Furthermore, the use of linaclotide, a guanylate cyclase C receptor agonist, is also available in these subjects, who suffer from moderate-severe constipation. The use of anxiolytics (such as benzodiazepines) in the short periods when the patient recognises the anxiety thereof, is useful in reducing psychological participation in pain, with reduction thereof. Similarly, besides directly modulating pain without altering psychic function, the use of antidepressants such as tricyclics and SSRIs (selective serotonin reuptake inhibitors) is capable of improving sleep quality and decreasing the frequency of attacks. Other therapies instead aim at controlling pain; in this sense, some spasmolytics are particularly useful. Anticholinergic-antispasmodic drugs (antimuscarinic drugs), such as for example atropine, scopolamine, mebeverine, are used to reduce gastric secretion and bowel motility. Similarly to the therapy of diverticular disease, tympani syndrome can be reduced by using poorly absorbable antibiotics, such as for example rifaximin, and probiotics that regulate gut flora.

However, the aforementioned treatments often do not allow a complete and lasting resolution of the disease and its symptoms.

The need therefore remains high to provide an effective solution for the treatment of gastrointestinal disorders, in particular functional gastrointestinal disorders, more in particular for irritable bowel syndrome (IBS), constipation, diarrhoea, alternating constipation and diarrhoea and unclassified IBS.

Furthermore, there is a need to provide an effective solution for the treatment of inflammatory gastrointestinal disorders, such as, for example, chronic inflammatory bowel diseases (IBD).

Following an extensive research and development activity, the Applicant addresses and solves the aforementioned needs by providing: novel strains of isolated bacteria, such as, (I.i) *Bifidobacterium breve* BbIBS01 (DSM 33231), (I.ii) *Bifidobacterium breve* BbIBS02 (DSM 33232), (I.iii) *Bifidobacterium animalis* subsp. *lactis* BlIBS01 (DSM 33233) and (I.iv) *Lactobacillus plantarum* LpIBS01 (DSM 33234) (in short, novel bacterial strains (I.i-I.iv) of the invention or (I.i-I.iv)); mixtures (M) comprising a bacterial strain *Bifidobacterium bifidum* MIMBb23sg or BbfIBS01 (DSM 32708), at least one or more of said bacterial strains (I.i-I.iv) and, optionally, at least one further bacterial strain selected from the group comprising or, alternatively, consisting of: *Lactobacillus casei* DG® (CNCM I-1572) and *Lactobacillus paracasei* LPC-S01™ (DSM 26760) (in short, mixtures (M) of the invention); compositions comprising said mixtures (M) (in short, compositions of the invention); the use of said strains, mixtures or compositions for the preventive and/or curative treatment of gastrointestinal disorders, preferably functional or inflammatory gastrointestinal disorders, more preferably irritable bowel syndrome (IBS) (diarrhoea, constipation, alternating constipation and diarrhoea, unclassified IBS), and/or inflammatory gastrointestinal disorders, more preferably chronic inflammatory bowel diseases (IBD), as reported in the present description and in the claims

*Lactobacillus plantarum* LpIBS01 (DSM 33234) was isolated from the human gastrointestinal tract. The Bifidobacteria in question, such as *Bifidobacterium breve* BbIBS01 (DSM 33231), (I.ii) *Bifidobacterium breve* BbIBS02 (DSM 33232), (I.iii) *Bifidobacterium animalis* subsp. *lactis* BlIBS01 (DSM 33233), are of human origin and they are naturally found in the human intestine.

Specifically, said novel bacterial strains of the invention (I.i-I.iv) or derivatives thereof, mixtures (M) of bacterial strains of the present invention and compositions comprising said mixtures (M) of the present invention, are effective in the preventive and/or curative treatment of gastrointestinal disorders, in particular with regard to functional gastrointestinal disorders, such as for example IBS, given that they determine:

- at the level of the gut microbiota, a positive modulation of the microbial populations present, such as for example an increase in the bacterial population of the genus *Lactobacillus* and of the genus *Bifidobacterium*, at the same time, a significant decrease in the bacterial population belonging to the genus *Ruminococcus*, a pathobiont normally associated with IBS;
- an increase in the intestinal concentration of short-chain fatty acids, in particular butyric and/or acetic acid;
- a positive modulation of the level of bacterial metabolic products (metabolomics), such as for example free amino acids and biogenic amines;
- a positive modulation of the inflammatory pathway, with, for example, a decrease in the pro-inflammatory cytokines, such as IL-6 and/or IL-15 or others;
- an improvement in intestinal permeability, evaluated for example through the serum levels of zonulin, citrulline and PV-1;
- a positive modulation at the level of the serotoninergic pathway.

Furthermore, the bacterial strains comprised in the mixtures and compositions of the present invention, such as strains belonging to the genus *Lactobacillus* and *Bifidobacterium*, produce a variety of beneficial effects given that each species exerts a distinct action on the gastrointestinal tract by means of various mechanisms such as, for example, secreting bacteriocins, modulating the immune system of the host and so on. Such actions may be complementary or synergistic.

In addition, said novel bacterial strains (I.i-I.iv), the mixtures (M) of bacterial strains and compositions comprising said mixtures (M) of the present invention affect the expression of different genes involved in the immune responses in the intestine, in particular in the ileum, making their anti-inflammatory/regulatory activity in the intestine plausible. Thus, the bacterial strains, mixtures and compositions of the invention are suitable and effective in the preventive and/or curative treatment of inflammatory gastrointestinal disorders, such as chronic inflammatory bowel diseases (IBD).

Although probiotic bacterial strains have been used in the prior art to improve IBS symptoms, the precise efficacy of probiotics in IBS remains largely unknown. Since probiotic bacterial strains belong to different strains and species, there is no definitive conclusion in the literature on which strain and species are most effective.

Furthermore, the novel bacterial strains, mixtures and compositions of the invention do not have significant adverse effects and they can be administered to all subjects, particularly to paediatric subjects and pregnant women.

Lastly, the mixtures or compositions of the invention are effective, easy to prepare and cost-effective.

These and other objects which will become clear from the detailed description that follows, are achieved by the bacterial strains, by the mixtures and by the compositions of the present invention thanks to the technical characteristics present in the description and claimed in the attached claims.

DESCRIPTION OF THE FIGURES

FIG. 1: design of the clinical trial with the run-in, treatment, cross-over, treatment and follow-up phases.

DETAILED DESCRIPTION OF THE INVENTION

Forming an object of the present invention is a bacterial strain belonging to the species *Bifidobacterium breve* identified as (I.i) *Bifidobacterium breve* BbIBS01, or a derivative thereof, wherein said bacterial strain was deposited as provided for by the Budapest Treaty, at Deutsche Sammlung von Mikroorganismen und Zellkulturen GmbH (DSMZ) under deposit number DSM 33231 on 31 Jul. 2019 by Sofar S.p.A. (in short, BbIBS01 or *B. breve* BbIBS01 DSM 33231 or (I.i)).

Forming an object of the present invention is a bacterial strain belonging to the species *Bifidobacterium breve* identified as (I.ii) *Bifidobacterium breve* BbIBS02, or a derivative thereof, wherein said bacterial strain was deposited according to the Budapest Treaty, at Deutsche Sammlung von Mikroorganismen und Zellkulturen GmbH (DSMZ) under deposit number DSM 33232 on 31 Jul. 2019 by Sofar S.p.A. (in short, BbIBS02 o *B. breve* BbIBS02 DSM 33232 or (I.ii)).

Forming an object of the present invention is a bacterial strain belonging to the species *Bifidobacterium animalis* identified as (I.iii) *Bifidobacterium animalis* subsp. *lactis* BlIBS01, or a derivative thereof, wherein said bacterial strain was deposited according to the Budapest Treaty, at Deutsche Sammlung von Mikroorganismen und Zellkulturen GmbH (DSMZ) under deposit number DSM 33233 on 31 Jul. 2019 by Sofar S.p.A. (in short, BlIBS01 or *B. animalis* subsp. *lactis* BlIBS01 DSM 33233 or (I.iii)).

Forming an object of the present invention is a bacterial strain belonging to the species *Lactobacillus plantarum* identified as (I.iv) *Lactobacillus plantarum* LpIBS01, or a derivative thereof, wherein said bacterial strain was deposited according to the Budapest Treaty, at Deutsche Sammlung von Mikroorganismen und Zellkulturen GmbH (DSMZ) under deposit number DSM 33234 on 31 Jul. 2019 by Sofar S.p.A. (in short, LpIBS01 or *L. plantarum* LpIBS01 DSM 33234 or (I.iv)).

Preferably, the bacterial strains of the present invention (i.e. (I.i), (I.ii), (I.iii), (I.iv), (II.i), (II.ii), (III)) are viable bacterial strains (live and viable), such as, for example, viable bacterial strains present in probiotic products or in Live Biotherapeutic Products (in short, LBP, such as pharmaceutical products comprising viable bacterial strains).

"Probiotics" are live and viable micro-organisms (i.e. bacterial strains) which, when administered in adequate amount, confer benefits to the health of the host; the term "probiotics" refers to micro-organisms present in or added to food (FAO and WHO definition).

In the context of the present invention, the term "derivative" or "derivatives" of a bacterial strain of the present invention (i.e. (I.i), (I.ii), (I.iii), (I.iv), (II.i), (II.ii), (III)) is used to indicate tyndalized or inactivated (for example, by gamma irradiation or sonication) bacterial strain, or lysates or extracts of the bacterial strain (paraprobiotics), or any derivative and/or component of the bacterial strain, preferably exopolysaccharide, parietal fraction, metabolites or metabolic bioproducts generated by the bacterial strain (postbiotics) and/or any other product derived from the bacterial strain. Preferably, the term "derivative" of the bacterial strains of the present invention is used to indicate the tyndalized or inactivated bacteria strain.

According to an aspect of the present invention, in the mixtures (M) of the invention or in the compositions of the invention, part of the bacterial strains can be viable and part of the bacterial strains can be in the form of derivatives, as defined above (e.g. tyndalized).

Forming an object of the present invention is a mixture (M) of bacterial strains (in short, mixture (M) of the invention) comprising or, alternatively, consisting of: a bacterial strain (III) *Bifidobacterium bifidum* MIMBb23sg (DSM 32708), or a derivative thereof, and at least one or more bacterial strains, or a derivative thereof, selected from the group A comprising or, alternatively, consisting of: (I.i) *B. breve* BbIBS01 (DSM 33231), (I.ii) *B. breve* BbIBS02 (DSM 33232), (I.iii) *B. animalis* subsp. *lactis* BlIBS01 (DSM 33233), (I.iv) *L. plantarum* LpIBS01 (DSM 33234), and mixtures thereof.

A bacterial strain identified as *Bifidobacterium bifidum* MIMBb23sg (alternatively named by the Applicant *Bifidobacterium bifidum* BbfIBS01 or, *Bifidobacterium bifidum* BbfIBLPC-S01) was deposited, according to the Budapest Treaty, at Deutsche Sammlung von Mikroorganismen und Zellkulturen GmbH (DSMZ) under deposit number DSM 32708 on 4 Dec. 2017 by Sofar S.p.A. (in short, MIMBb23sg or BbfIBS01 or BbfIBLPC-S01 or *B. bifidum* MIMBb23sg DSM 32708 or (III)). It should be observed that it is still and exclusively the same bacterial strain irrespective of the internal name MIMBb23sg or BbfIBS01 or BbfIBLPC-S01, used by the Applicant. The bacterial strain *Bifidobacterium bifidum* MIMBb23sg DSM 32708 is a strain isolated from the faeces of a healthy adult woman.

In the context of the present invention the following groups/mixtures of bacterial strains are defined: mixture comprising a single bacterial strain selected from the group A comprising or, alternatively, consisting of: (I.i), (I.ii), (I.iii) and (I.iv); in short mixture M.1;

mixture comprising two bacterial strains selected from group M.2 consisting of: (I.i) and (I.ii), (I.i) and (I.iii), (I.i) and (I.iv), (I.ii) and (I.iii), (I.ii) and (I.iv), (I.iii) and (I.iv); in short mixture M.2;

mixture comprising three bacterial strains selected from group M.3 consisting of: (I.i) and (I.ii) and (I.iii), (I.i) and (I.ii) and (I.iv), (I.i) and (I.iii) and (I.iv), (I.ii) and (I.iii) and (I.iv); in short mixture M.3;

mixture comprising four bacterial strains selected from group M.4 consisting of: (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234); in short mixture M.4.

Besides a bacterial strain (III) *Bifidobacterium bifidum* MIMBb23sg (DSM 32708), said mixture (M) of the invention may comprise a single bacterial strain selected from the group A comprising or, alternatively, consisting of: (I.i), (I.ii), (I.iii) and (I.iv); in short mixture (III)+M.1.

Besides a bacterial strain (III) *Bifidobacterium bifidum* MIMBb23sg (DSM 32708), said mixture (M) of the invention may comprise two bacterial strains selected from group M.2 consisting of: (I.i) and (I.ii), (I.i) and (I.iii), (I.i) and (I.iv), (I.ii) and (I.iii), (I.ii) and (I.iv), (I.iii) and (I.iv); in short mixture (III)+M.2.

Besides a bacterial strain (III) *Bifidobacterium bifidum* MIMBb23sg (DSM 32708), said mixture (M) of the invention may comprise three bacterial strains selected from group M.3 consisting of: (I.i) and (I.ii) and (I.iii), (I.i) and (I.ii) and (I.iv), (I.i) and (I.iii) and (I.iv), (I.ii) and (I.iii) and (I.iv); in short mixture (III)+M.3.

Besides a bacterial strain (III) *Bifidobacterium bifidum* MIMBb23sg (DSM 32708), said mixture (M) of the invention may comprise four bacterial strains selected from group M.4 consisting of: (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234); in short mixture (III)+M.4.

Besides a bacterial strain (III) *Bifidobacterium bifidum* MIMBb23sg (DSM 32708), or a derivative thereof, and besides at least one or more bacterial strains selected from group A, or a derivative thereof, in an embodiment of the present invention the mixture (M) of the invention, comprises at least one further bacterial strain selected from the group B comprising or, alternatively, consisting of: a bacterial strain (II.i) *Lactobacillus casei* DG® (CNCM I-1572), a bacterial strain (II.ii) *Lactobacillus paracasei* LPC-S01™ (DSM 26760), and a mixture thereof.

A bacterial strain identified as *Lactobacillus casei* DG® (registered trademark by SOFAR S.p.A.) was deposited by SOFAR S.p.A. at the National Collection of cultures of microorganisms of the Pasteur Institute in Paris under accession number CNCM I-1572 on 5 May 1995 by SOFAR S.p.A. (in short, DG® or *L. casei* DG® CNCM I-1572 or (II.i)); the strain was initially named *Lactobacillus casei* DG® sub. *casei*; it was subsequently reclassified as *Lactobacillus paracasei* DG® CNCM I-1572. It should be observed that it is still and exclusively the same bacterial strain irrespective of the name *Lactobacillus casei* DG® CNCM I-1572 or *Lactobacillus paracasei* DG® CNCM I-1572.

A bacterial strain identified as *Lactobacillus paracasei* LPC-S01™, alternatively named *Lactobacillus paracasei* S01, was deposited at Deutsche Sammlung von Mikroorganismen und Zellkulturen GmbH (DSMZ) under accession number DSM 26760 on 15 May 2017 by SOFAR S.p.A.

(date of application for conversion of the deposit into a deposit according to the Budapest Treaty; date of original deposit: 11 Jan. 2013) (in short, LPC-S01 or *L. paracasei* LPC-S01 DSM 26760 or (II.ii)). It should be observed that it is still and exclusively the same bacterial strain irrespective of the name used by the Applicant *Lactobacillus paracasei* S01 DSM 26760 or *Lactobacillus paracasei* LPC-S01™ DSM 26760.

In a preferred embodiment of the present invention, besides a bacterial strain (III) *Bifidobacterium bifidum* MIMBb23sg (DSM 32708) and at least one or more bacterial strains selected from group A, the mixture (M) of the invention, further comprises the bacterial strain (II.i) *Lactobacillus casei* DG® (CNCM I-1572), or derivatives thereof (i.e. Mixture (III)+(M)+(II.i), wherein M may be M.1, M.2, M.3 or M.4).

In an embodiment of the present invention, besides a bacterial strain (III) *Bifidobacterium bifidum* MIMBb23sg (DSM 32708) and at least one or more bacterial strains selected from group A, the mixture (M) of the invention further comprises a bacterial strain (II.ii) *Lactobacillus paracasei* LPC-S01™ (DSM 26760), or derivatives thereof (i.e. miscela (III)+(M)+(II.ii), wherein M may be M.1, M.2, M.3 or M.4).

In an embodiment of the present invention, besides the bacterial strain (III) *Bifidobacterium bifidum* MIMBb23sg (DSM 32708) and at least one or more bacterial strains selected from group A, the mixture (M) of the invention further comprises a bacterial strain (II.i) *Lactobacillus casei* DG® (CNCM I-1572) and the bacterial strain (II.ii) *Lactobacillus paracasei* LPC-S01™ (DSM 26760), or derivatives thereof (i.e. Mixture (III)+(M)+(II.i)(II.ii), wherein M may be M.1, M.2, M.3 or M.4).

According to an aspect of the invention, besides the bacterial strain (III) *Bifidobacterium bifidum* MIMBb23sg (DSM 32708), said mixture (M) of the invention comprises a bacterial strain selected from the group A (or group of mixtures M.1), as defined in the present invention, and a bacterial strain (II.i) *Lactobacillus casei* DG® (CNCM I-1572), or derivatives thereof (i.e.: (III) and (I.i) and (II.i), (III) and (I.ii) and (II.i), (III) and (I.iii) and (II.i), (III) and (I.iv) and (II.i); in short mixture (III)+M.1+(II.i)).

According to an aspect of the invention, besides the bacterial strain (III) *Bifidobacterium bifidum* MIMBb23sg (DSM 32708), said mixture (M) of the invention comprises two bacterial strains selected from group of mixtures M.2, as defined in the present invention, and a bacterial strain (II.i) *Lactobacillus casei* DG® (CNCM I-1572), or derivatives thereof (i.e.: (III) and (I.i) and (I.ii) and (II.i), (III) and (I.i) and (I.iii) and (II.i), (III) and (I.i) and (I.iv) and (II.i), (III) and (I.ii) and (I.iii) and (II.i), (III) and (I.ii) and (I.iv) and (II.i), (III) and (I.iii) and (I.iv) and (II.i); in short mixture (III)+M.2+(II.i)).

According to an aspect of the invention, besides the bacterial strain (III) *Bifidobacterium bifidum* MIMBb23sg (DSM 32708), said mixture (M) of the invention comprises three bacterial strains selected from group of mixtures M.3, as defined in the present invention, and a bacterial strain (II.i) *Lactobacillus casei* DG® (CNCM I-1572), or derivatives thereof (i.e.: (III) and (I.i) and (I.ii) and (I.iii) and (II.i), (III) and (I.i) and (I.ii) and (I.iv) and (II.i), (III) and (I.i) and (I.iii) and (I.iv) and (II.i), (III) and (I.ii) and (I.iii) and (I.iv) and (II.i); in short mixture (III)+M.3+(II.i)).

In a preferred embodiment of the present invention, besides the bacterial strain (III) *Bifidobacterium bifidum* MIMBb23sg (DSM 32708), said mixture (M) of the invention comprises the four bacterial strains (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and a bacterial strain (II.i) *Lactobacillus casei* DG® (CNCM I-1572), or derivatives thereof (in short mixture (III)+M.4+(II.i)).

In an embodiment of the present invention, besides the bacterial strain (III) *Bifidobacterium bifidum* MIMBb23sg (DSM 32708), said mixture (M) of the invention comprises the four bacterial strains (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and a bacterial strain (II.ii) *Lactobacillus paracasei* LPC-S01™ (DSM 26760), or derivatives thereof (in short mixture (III)+M.4+(II.ii)).

In an embodiment of the present invention, besides the bacterial strain (III) *Bifidobacterium bifidum* MIMBb23sg (DSM 32708), said mixture (M) of the invention comprises the four bacterial strains (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and a bacterial strain (II.i) *Lactobacillus casei* DG® (CNCM I-1572) and a bacterial strain (II.ii) *Lactobacillus paracasei* LPC-S01™ (DSM 26760), or derivatives thereof (in short mixture (III)+M.4+(II.i)+(II.ii)).

In the context of the present invention, the expression "mixture/s (M) of the invention" is/are used to indicate the mixtures (III)+M.1, (III)+M.2, (III)+M.3, (III)+M.4, (III)+M.1+(II.i), (III)+M.1+(II.ii), (III)+M.1+(II.i)+(II.ii), (III)+M.2+(II.i), (III)+M.2+(II.ii), (III)+M.2+(II.i)+(II.ii), (III)+M.3+(II.i), (III)+M.3+(II.ii), (III)+M.3+(II.i)+(II.ii), (III)+M.4+(II.i), (III)+M.4+(II.ii) and (III)+M.4+(II.i)+(II.ii), as defined in the context of the present invention.

Forming an object of the present invention is a composition is a composition (in short, composition of the invention) comprising a mixture (M) comprising or, alternatively, consisting of: a bacterial strain (III) *Bifidobacterium bifidum* MIMBb23sg (DSM 32708) and at least one or more bacterial strains (i.e. two, three or four strains), or a derivative thereof, selected from the group A comprising or, alternatively, consisting of: (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234), and, optionally, said composition comprises at least one food or pharmaceutical grade additive and/or excipient.

In the context of the present invention, the expression "composition/s of the invention" is/are used to indicate the compositions comprising the mixtures (III)+M.1, (III)+M.2, (III)+M.3, (III)+M.4, (III)+M.1+(II.i), (III)+M.1+(II.ii), (III)+M.1+(II.i)+(II.ii), (III)+M.2+(II.i), (III)+M.2+(II.ii), (III)+M.2+(II.i)+(II.ii), (III)+M.3+(II.i), (III)+M.3+(II.ii), (III)+M.3+(II.i)+(II.ii), (III)+M.4+(II.i), (III)+M.4+(II.ii) and (III)+M.4+(II.i)+(II.ii), as defined in the context of the present invention.

In an embodiment, the composition of the invention comprises a mixture ((III)+M.1) comprising or, alternatively, consisting of: a bacterial strain (III) *Bifidobacterium bifidum* MIMBb23sg (DSM 32708) and a bacterial strain selected from the group A comprising or, alternatively, consisting of: (I.i), (I.ii), (I.iii) and (I.iv).

In an embodiment, the composition of the invention comprises a mixture ((III)+M.2) comprising or, alternatively, consisting of: a bacterial strain (III) *Bifidobacterium*

*bifidum* MIMBb23sg (DSM 32708) and two bacterial strains selected from group of mixtures M.2 as defined in the present invention.

In an embodiment, the composition of the invention comprises a mixture ((III)+M.3) comprising or, alternatively, consisting of: a bacterial strain (III) *Bifidobacterium bifidum* MIMBb23sg (DSM 32708) and three bacterial strains selected from group of mixtures M.3 as defined in the present invention.

In a preferred embodiment, the composition of the invention comprises a mixture ((III)+M.4) comprising or, alternatively, consisting of: a bacterial strain (III) *Bifidobacterium bifidum* MIMBb23sg (DSM 32708) and four bacterial strains, such as: (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) (in short, (III), (I.i), (I.ii), (I.iii) and (I.iv)).

In an embodiment of the present invention, the composition of the invention comprises the mixture (M) of the invention which, besides a bacterial strain (III) *Bifidobacterium bifidum* MIMBb23sg (DSM 32708) and besides at least one or more bacterial strains selected from group A, comprises at least one further bacterial strains selected from the group B comprising or, alternatively, consisting of: a bacterial strain (II.i) *Lactobacillus casei* DG® (CNCM I-1572) and a bacterial strain (II.ii) *Lactobacillus paracasei* S01 (DSM 26760), such as mixture (III)+M+(II.i) or mixture (III)+M+(II.ii) or mixture (III)+M+(II.i)+(II.ii), wherein M may be M.1, M.2, M.3 or M.4 as defined in the context of the present invention.

In a preferred embodiment of the present invention, the composition of the invention comprises the mixture (M) of the invention which, besides a bacterial strain (III) *Bifidobacterium bifidum* MIMBb23sg (DSM 32708) and besides at least one or more bacterial strains selected from group A, further comprises a bacterial strain (II.i) *Lactobacillus casei* DG® (CNCM I-1572), or derivatives thereof (i.e. Mixture (III)+(M)+(II.i), wherein M may be M.1, M.2, M.3 or M.4).

In an embodiment of the present invention, the composition of the invention comprises the mixture (M) of the invention which, besides a bacterial strain (III) *Bifidobacterium bifidum* MIMBb23sg (DSM 32708) and besides at least one or more bacterial strains selected from group A, further comprises a bacterial strain (II.ii) *Lactobacillus paracasei* LPC-S01 (DSM 26760), or derivatives thereof (i.e. mixture (III)+(M)+(II.ii), wherein M may be M.1, M.2, M.3 or M.4).

In an embodiment of the present invention, the composition of the invention comprises the mixture (M) of the invention which, besides a bacterial strain (III) *Bifidobacterium bifidum* MIMBb23sg (DSM 32708) and besides at least one or more bacterial strains selected from group A, further comprises a bacterial strain (II.i) *Lactobacillus casei* DG® (CNCM I-1572) and a bacterial strain (II.ii) *Lactobacillus paracasei* LPC-S01™ (DSM 26760), or derivatives thereof (i.e. mixture (III)+(M)+(II.i)(II.ii), wherein M may be M.1, M.2, M.3 or M.4).

According to an aspect of the invention, the composition of the invention comprises said mixture ((III)+M.1+(II.i)) of the invention comprising or, alternatively, consisting of: a bacterial strain (III) *Bifidobacterium bifidum* MIMBb23sg (DSM 32708) and bacterial strain selected from the group A (or group of mixtures M.1), as defined in the present invention, and a bacterial strain (II.i) *Lactobacillus casei* DG® (CNCM I-1572).

According to an aspect of the invention, the composition of the invention comprises said mixture ((III)+M.2+(II.i)) of the invention comprising or, alternatively, consisting of: a bacterial strain (III) *Bifidobacterium bifidum* MIMBb23sg (DSM 32708) and two bacterial strains selected from group of mixtures M.2, as defined in the present invention, and a bacterial strain (II.i) *Lactobacillus casei* DG® (CNCM I-1572).

According to an aspect of the invention, the composition of the invention comprises said mixture ((III)+M.3+(II.i)) of the invention comprising or, alternatively, consisting of: a bacterial strain (III) *Bifidobacterium bifidum* MIMBb23sg (DSM 32708) and three bacterial strains selected from group of mixtures M.3, as defined in the present invention, and a bacterial strain (II.i) *Lactobacillus casei* DG® (CNCM I-1572).

In a preferred embodiment of the present invention, the composition of the invention comprises said mixture ((III)+(M.4)+(II.i)) of the invention comprising or, alternatively, consisting of: a bacterial strain (III) *Bifidobacterium bifidum* MIMBb23sg (DSM 32708) and four bacterial strains (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and a bacterial strain (II.i) *Lactobacillus casei* DG® (CNCM I-1572).

In an embodiment of the present invention, the composition of the invention comprises said mixture ((III)+(M.4)+(II.ii)) of the invention comprising or, alternatively, consisting of: a bacterial strain (III) *Bifidobacterium bifidum* MIMBb23sg (DSM 32708) and four bacterial strains (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and a bacterial strain (II.ii) *Lactobacillus paracasei* LPC-S01™ (DSM 26760).

According to an aspect of the invention, the composition of the invention comprises said mixture ((III)+(M.4)+(II.i)+(II.ii)) of the invention comprising or, alternatively, consisting of: a bacterial strain (III) *Bifidobacterium bifidum* MIMBb23sg (DSM 32708) and the four bacterial strains (I.i), (I.ii), (I.iii) and (I.iv) and the bacterial strains (II.i) *Lactobacillus casei* DG® (CNCM I-1572) and (II.ii) *Lactobacillus paracasei* LPC-S01™ (DSM 26760).

Preferably, said bacterial strains (i.e. (III), (I.i), (I.ii), (I.iii), (I.iv), (II.i) and/or (II.ii)) are comprised, independently of each other, in the mixtures (M) of the invention at a concentration comprised in the range from $1\times10^6$ CFU a $1\times10^{12}$ CFU, preferably from $1\times10^7$ CFU to $1\times10^{11}$ CFU, more preferably from $1\times10^8$ CFU to $1\times10^{10}$ CFU, for example $1\times10^9$ CFU, with respect to the daily intake (CFU: Colony Forming Unit).

In a preferred embodiment, the mixture (III)+M.4 or (III)+M.4+(II.i) or (III)+M.4+(II.ii) (III)+M.4+(II.i)+(II.ii) or the relative compositions of the invention comprise, independently from each other, each of the bacterial strains (III), (I.i), (I.ii), (I.iii), (I.iv) and, optionally, (II.i) and/or (II.ii) at a concentration comprised in the range from $1\times10^6$ CFU to $1\times10^{12}$ CFU, preferably from $1\times10^7$ CFU to $1\times10^{11}$ CFU, more preferably from $1\times10^8$ CFU to $1\times10^{10}$ CFU, for example $1\times10^9$ CFU, with respect to the daily intake.

Preferably, in the mixture (III)+M.2 o (III)+M.1+(II.i) or (III)+M.1+(II.ii) the bacterial strains are at a ratio of about 1:1:1, in the mixture (III)+M.3 or (III)+M.2+(II.i) or (III)+M.2+(II.ii) the bacterial strains are at a ratio of about 1:1:1:1, in the mixture (III)+M.4 or (III)+M.3+(II.i) or (III)+M.3+(II.ii) the bacterial strains are at a ratio of about 1:1:1:1:1, in the mixture (III)+M.4+(II.i) or (III)+M.4+(II.ii) the bacterial strains are at a ratio of about 1:1:1:1:1:1, in the mixture (III)+M.4+(II.i)+(II.ii) the bacterial strains are at a ratio of about 1:1:1:1:1:1:1; wherein said ratios are with respect to the CFU.

In an embodiment, besides one of said mixtures (M) of the invention (preferably (III)+M4 or (III)+M.4+(II.i) or (III)+M.4+(II.ii)), the composition of the present invention may comprise at least one further active component selected from the group comprising or, alternatively, consisting of: other viable bacterial strains and/or paraprobiotics and/or postbiotics and/or lysed and/or tyndalized and/or inactivated bacterial strains, enzymes, substances with direct or indirect anti-acid action, prebiotic substances, probiotic substances belonging to the families of yeasts and bacteria, immunostimulant substances, anti-diarrhoea substances, nutrients, vitamins of group B, C, D, E, organic and/or inorganic salts of magnesium, of selenium, of zinc, melatonin, valerian, passion flowers, lemon balm, hawthorn, chamomile, hops, antioxidants, anti-radical agents.

The composition of the invention may be in solid form, such as tablet, chewable tablet, tablet to be dissolved in the mouth or mouth-soluble, capsule, lozenge, granules, flakes or powder (granules or powder to be dissolved in a liquid or mouth-soluble granules or powder, for example mouth-soluble stick), in semi-solid form, such as soft-gel, cream, or in liquid form, such as solution, suspension, dispersion, emulsion or syrup.

The composition of the invention may be formulated for oral (or gastroenteric), sublingual (or buccal), transmucosal, transdermal and/or topical use (or administration), such as rectal, cutaneous, vaginal; it is advantageously formulated for oral use.

The composition of the invention, comprising or, alternatively, consisting of one of said mixtures (M) of the invention (preferably (III)+M.4 or (III)+M.4+(II.i) or (III)+M.4+(II.ii)), further optionally comprises said at least one pharmaceutical or food grade additive and/or excipient, i.e. a substance devoid of therapeutic activity suitable for pharmaceutical or food use. In the context of the present invention additives and/or excipients acceptable for pharmaceutical or food use comprise all auxiliary substances known to the man skilled in the art for the preparation of compositions in solid, semi-solid or liquid form, such as, for example, diluents, solvents (including water, glycerine, ethyl alcohol), solubilisers, acidifiers, thickeners, sweeteners, flavour enhancers, colouring agents, lubricants, surfactants, preservatives, pH stabilising buffers and mixtures thereof.

The composition of the invention, comprising or, alternatively, consisting of one of said mixtures (M) of the invention (preferably (III)+M.4 or (III)+M.4+(II.i) or (III)+M.4+(II.ii)), may be a pharmaceutical composition (or Live Biotherapeutic Products), a medical device composition, a dietary supplement, a food or novel food, or probiotic product, a cosmetic composition, a composition for food for special medical purposes (FSMP).

In the context of the present invention, the expression "medical device" is used in the meaning according to the Italian Legislative Decree no 46 dated 24 Feb. 1997 or according to the new Medical Device Regulation (EU) 2017/745 (MDR).

Forming a further object of the present invention are said mixtures (M) of the invention (preferably (III)+M.4 or (III)+M.4+(II.i) or (III)+M.4+(II.ii)) or said compositions of the invention comprising one of said mixtures (M) of the invention (preferably (III)+M.4 or (III)+M.4+(II.i) or (III)+M.4+(II.ii)) for use as medicament.

Said mixtures (M) or said compositions of the invention may also be for use as medicament as adjuvants of further therapeutic approaches, preferably of the pharmacological or dietary type.

In an embodiment, the bacterial strains of the invention, the mixtures (M) of the invention (preferably (III)+M.4 or (III)+M.4+(II.i) or (III)+M.4+(II.ii)) or the compositions of the invention are for use in a method for the preventive and/or curative treatment of gastrointestinal diseases, disorders or symptoms in a subject in need, preferably of functional gastrointestinal disorders such as irritable bowel syndrome (IBS), dyspepsia, pyrosis, oesophagus, stomach and duodenum disorders, small intestinal bacterial overgrowth (SIBO), disorders with sub-inflammatory conditions, preferably wherein said sub-inflammatory conditions are in an elderly person or in a subject with diverticular disease.

In a preferred embodiment, the bacterial strains of the invention, the mixtures (M) of the invention (preferably (III)+M.4 or (III)+M.4+(II.i) or (III)+M.4+(II.ii)) or the compositions of the invention are for use in a method for the preventive and/or curative treatment of disorders or symptoms of irritable bowel syndrome (IBS), constipation, diarrhoea, alternating constipation and diarrhoea and unclassified IBS. Specific examples of disorders or symptoms of the irritable bowel syndrome (IBS) that can be treated by the bacterial strains of the invention, the mixtures (M) of the invention or the compositions of the invention are: intermittent abdominal pain, in the form of cramps, with varying intensity and localisation; flatulence; tympanites; bloating sensation.

In a preferred embodiment of the invention, the mixture (III)+M.4+(II.i) or the composition comprising the mixture (III)+M.4+(II.i), wherein said mixture (III)+M.4+(II.i) comprises or, alternatively consists of bacterial strains (III) *Bifidobacterium bifidum* MIMBb23sg (DSM 32708), (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and (II.i) *Lactobacillus casei* DG® (CNCM I-1572), is for use in a method for the preventive and/or curative treatment of disorders or symptoms of the irritable bowel syndrome (IBS), constipation, diarrhoea, alternating constipation and diarrhoea and unclassified IBS.

In an alternative embodiment of the invention, the mixture (III)+M.4+(II.ii) or the composition comprising the mixture (III)+M.4+(II.ii), wherein said mixture (III)+M.4+(II.ii) comprises or, alternatively consists of the bacterial strains (III) *Bifidobacterium bifidum* MIMBb23sg (DSM 32708), (I.i) *B. breve* BbIBS01 (DSM 33231), (I.ii) *B. breve* BbIBS02 (DSM 33232), (I.iii) *B. animalis* subsp. *lactis* BlIBS01 (DSM 33233) and (I.iv) *L. plantarum* LpIBS01 (DSM 33234) and (II.ii) *Lactobacillus paracasei* LPC-S01™ (DSM 26760), is for use in a method for the preventive and/or curative treatment disorders or symptoms of the irritable bowel syndrome (IBS), constipation, diarrhoea, alternating constipation and diarrhoea and unclassified IBS.

In an embodiment, the bacterial strains of the invention, the mixtures (M) of the invention (preferably (III)+M.4 or (III)+M.4+(II.i) or (III)+M.4+(II.ii)) or the compositions of the invention are for use in the treatment of inflammatory gastrointestinal diseases, disorders or symptoms in a subject in need, such as *Helicobacter pylori*, peptic or gastric ulcers, duodenal ulcer, chronic inflammatory bowel diseases (IBD), such as Crohn's disease and ulcerative colitis, microscopic colitis, diverticular disease and diverticulitis; preferably chronic inflammatory bowel diseases (IBD), Crohn's disease, ulcerative colitis, microscopic colitis, diverticular disease or diverticulitis.

In an embodiment, the bacterial strains of the invention, the mixtures (M) of the invention (preferably (III)+M.4 or (III)+M.4+(II.i) or (III)+M.4+(II.ii)) or the compositions of the invention are for use as immunomodulatory agents (capable of modulating the immune system) and/or immunostimulants of the subject to whom they are administered. Therefore, the bacterial strain, or a derivative thereof, and the compositions of the present invention have a valid application for the preventive or curative treatment of diseases related with alterations of the immune system, in particular autoimmune diseases and allergies, immunodeficiency diseases, diseases affecting the skin, such as acne, atopic dermatitis.

Advantageously, the bacterial strains of the invention, the mixtures (M) and the compositions of the present invention are capable of positively modulating the inflammatory pathway and, thus, the ratio between inflammatory cytokines and anti-inflammatory cytokines. In particular, the bacterial strains of the invention, the mixtures (M) of the present invention and the compositions of the present invention are capable of reducing the production of pro-inflammatory cytokines, preferably IL-6, IL-15, IL-12 and TNF-α, and/or increasing the production of anti-inflammatory cytokines, preferably IL-10.

Thus, in an embodiment of the present invention, the bacterial strains of the invention, the mixtures (M) of the invention (preferably (III)+M.4 or (III)+M.4+(II.i) or (III)+M.4+(II.ii)) and the compositions of the invention are for use in a method for the preventive and/or curative treatment of diseases or symptoms or disorders caused by or related with/accompanied by an increases in the pro-inflammatory cytokines and/or a decrease in the anti-inflammatory cytokines, preferably diseases affecting: locomotor system (muscular and skeletal system), digestive system, urogenital system (urinary system and genital system), respiratory system, integumentary system, immune system and circulatory system.

In an embodiment, the bacterial strains of the invention, said mixtures (M) of the invention (preferably (III)+M.4 or (III)+M.4+(II.i) or (III)+M.4+(II.ii)) or said compositions of the invention are for use in a method for the preventive or curative treatment of inflammatory musculoskeletal, rheumatological, inflammatory articular and/or post-surgery inflammatory diseases, preferably for use in methods for the treatment of osteoarthritis, rheumatoid arthritis and ankylosing spondylitis, in particular osteoarthritis of the knee and osteoarthritis of the joints in general.

Forming an object of the present invention is a method for the preventive or curative treatment of gastrointestinal diseases, disorders or symptoms, in particular functional or inflammatory gastrointestinal disorders, preferably IBS (constipation, diarrhoea, alternating constipation and diarrhoea, unclassified IBS) or IBD, which provides for the administration of a therapeutically effective amount of one of the mixtures (M) of the invention or of the compositions of the invention comprising one of said mixtures (M) of the invention to a subject in need.

For the sake clarity, in order to achieve the object of the present invention, the components (or active components) of the mixture (M) of the invention, such as the bacterial strains in the present invention, may be administered separately (preferably within a time interval ranging from 30 minutes to 60 minutes) and in any order but, preferably, the bacterial strains are administered to a subject simultaneously, even more preferably in a single composition to obtain a more rapid effect and ease of administration. When the components (or active components) of the mixture (M) of the invention, such as the bacterial strains, are administered in a single composition, said single composition corresponds to the composition of the present invention.

In the context of the present invention, the expression "subjects" is used to indicate human subjects or animal subjects (e.g. pets, such as dogs or cats or other mammals). Preferably, the compositions of the invention are for use in treatment methods for human subjects.

Unless otherwise specified, the expression composition or mixture or other comprising a component at an amount "comprised in a range from x to y" is used to indicate that said component may be present in the composition or mixture or extract or other at all amounts present in said range, even if not specified, extremes of the range comprised.

The expression "therapeutically effective amount" refers to the amount of composition, mixture and/or bacterial strain that elicits the biological or medicinal response in a tissue, system, mammal, or human being that is sought and defined by an individual, researcher, veterinarian, physician, or other clinician or health worker.

In the context of the present invention the term "novel food" is used in its meaning according to the EU Regulation 2015/2283 of 25 Nov. 2015.

Embodiments (FRn) of the present invention are reported hereinafter.

FR1. A composition comprising a mixture M comprising or, alternatively, consisting of:

a bacterial strain identified as *Bifidobacterium bifidum* MIMBb23sg (or BbfIBS01) and deposited at Deutsche Sammlung von Mikroorganismen und Zellkulturen GmbH (DSMZ) under deposit number DSM 32708 on 4 Dec. 2017 by Sofar S.p.A, or a derivative thereof; and at least one bacterial strain, or a derivative thereof, selected from the group A comprising or, alternatively, consisting of:

a bacterial strain identified as *Bifidobacterium breve* BbIBS01 and deposited at Deutsche Sammlung von Mikroorganismen und Zellkulturen GmbH (DSMZ) under deposit number DSM 33231 on 31 Jul. 2019 by Sofar S.p.A., a bacterial strain identified as *Bifidobacterium breve* BbIBS02 and deposited at Deutsche Sammlung von Mikroorganismen und Zellkulturen GmbH (DSMZ) under deposit number DSM 33232 on 31 Jul. 2019 by Sofar S.p.A., a bacterial strain identified as *Bifidobacterium animalis* subsp. *lactis* BlIBS01 and deposited at Deutsche Sammlung von Mikroorganismen und Zellkulturen GmbH (DSMZ) under deposit number DSM 33233 on 31 Jul. 2019 by Sofar S.p.A., a bacterial strain identified as *Lactobacillus plantarum* LpIBS01 and deposited at Deutsche Sammlung von Mikroorganismen und Zellkulturen GmbH (DSMZ) under deposit number DSM 33234 on 31 Jul. 2019 by Sofar S.p.A., and mixtures thereof;

and, optionally, said composition comprises at least one food or pharmaceutical grade additive and/or excipient.

FR2. A composition according to FR1, wherein said mixture M comprises or, alternatively, consists of bacterial strains:

*Bifidobacterium bifidum* MIMBb23sg (or BbfIBS01) DSM 32708 or a derivative thereof,

*Bifidobacterium breve* BbIBS01 DSM 33231 or a derivative thereof,

*Bifidobacterium breve* BbIBS02 DSM 33232 or a derivative thereof,

*Bifidobacterium animalis* subsp. *lactis* BlIBS01 DSM 33233 or a derivative thereof, and

*Lactobacillus plantarum* LpIBS01 DSM 33234 or a derivative thereof.

FR3. A composition according to FR1 or FR2, wherein said mixture M further comprises at least one further bacterial strain selected from the group B comprising or, alternatively, consisting of:

a bacterial strain identified as *Lactobacillus casei* DG® and deposited at the National Collection of Cultures of Microorganisms of the Pasteur Institute in Paris under access number CNCM I-1572 on 5 May 1995 by SOFAR S.p.A., and a bacterial strain identified as *Lactobacillus paracasei* LPC-S01™ and deposited at Deutsche Sammlung von Mikroorganismen und Zellkulturen GmbH (DSMZ) under accession number DSM 26760 on 15 May 2017 by SOFAR S.p.A., or derivatives thereof.

FR4. A composition according to FR3, wherein said mixture M comprises or, alternatively, consists of bacterial strains:

*Bifidobacterium bifidum* MIMBb23sg (or BbfIBS01) DSM 32708 or a derivative thereof,

*Bifidobacterium breve* BbIBS01 DSM 33231 or a derivative thereof,

*Bifidobacterium breve* BbIBS02 DSM 33232 or a derivative thereof,

*Bifidobacterium animalis* subsp. *lactis* BlIBS01 DSM 33233 or a derivative thereof,

*Lactobacillus plantarum* LpIBS01 DSM 33234 or a derivative thereof, and

*Lactobacillus casei* DG® CNCM I-1572 or a derivative thereof.

FR5. A composition according to FR3, wherein said mixture M comprises or, alternatively, consists of bacterial strains:

*Bifidobacterium bifidum* MIMBb23sg (or BbfIBS01) DSM 32708 or a derivative thereof,

*Bifidobacterium breve* BbIBS01 DSM 33231 or a derivative thereof,

*Bifidobacterium breve* BbIBS02 DSM 33232 or a derivative thereof,

*Bifidobacterium animalis* subsp. *lactis* BlIBS01 DSM 33233 or a derivative thereof,

*Lactobacillus plantarum* LpIBS01 DSM 33234 or a derivative thereof, and

*Lactobacillus paracasei* LPC-S01™ DSM 26760 or a derivative thereof.

FR6. The composition according to any one of FRs 1 to 5, wherein said composition is formulated for oral, sublingual or buccal, transmucosal, topical, rectal, cutaneous or vaginal use; preferably it is formulated for oral use.

FR7. The composition according to any one of FRs 1 to 6, wherein said composition is for use as a medicament.

FR8. The composition according to any one of FRs 1 to 6, wherein said composition is for use in a method for the preventive and/or curative treatment of functional gastrointestinal diseases, disorders and/or symptoms.

FR9. The composition according to FR8, wherein said composition is for use in a method for the preventive and/or curative treatment of functional gastrointestinal diseases, disorders and/or symptoms selected from the group comprising or, alternatively, consisting of: irritable bowel syndrome (IBS), dyspepsia, pyrosis, oesophagus, stomach and duodenum disorders, small intestinal bacterial overgrowth (SIBO), gastrointestinal disorders with sub-inflammatory conditions.

FR10. The composition according to FR9, wherein said composition is for use in a method for the preventive or curative treatment of the irritable bowel syndrome (IBS) constipation or of the irritable bowel syndrome (IBS) diarrhoea or of the irritable bowel syndrome (IBS) alternating constipation and diarrhoea or of the irritable Bowel Syndrome (IBS) unclassified.

FR11. The composition according to any one of FRs 1 to 6 for use in a method for the preventive and/or curative treatment of inflammatory gastrointestinal diseases, disorders and/or symptoms.

FR12. The composition according to FR11, wherein said composition is for use in a method for the preventive or curative treatment of inflammatory gastrointestinal disorders selected from the group comprising or, alternatively, consisting of: chronic inflammatory bowel diseases (IBD), Crohn's disease, ulcerative colitis, microscopic colitis, diverticulitis, *Helicobacter pylori*, peptic or gastric ulcers, and duodenal ulcer; preferably selected from chronic inflammatory bowel diseases (IBD), Crohn's disease, ulcerative colitis, microscopic colitis, diverticular disease and diverticulitis.

EXPERIMENTAL PART

Evaluation of the efficacy of the combination of 6 viable bacterial strains in the treatment of patients suffering from irritable bowel syndrome (IBS); multicentre, randomised, double-blind, parallel group, placebo-controlled trial.

1. Objectives of the Trial

Primary objective: to evaluate the effect of a combined supplement of 6 probiotic strains according to the invention (Composition 1) on the gut microbiota of patients suffering from IBS.

Secondary objectives

1. To evaluate the effect of Composition 1 on the symptoms of IBS;
2. To evaluate the effect of Composition 1 on abdominal pain/discomfort;
3. To evaluate the effect of Composition 1 on the daily bowel habits of the patient suffering from IBS;
4. To evaluate the effect of Composition 1 on the intestinal permeability;
5. To evaluate the recovery of strains of Composition 1 in stool samples;
6. To evaluate the overall satisfaction of the treatment;
7. To evaluate the change in the quality of life of the patients;
8. To evaluate the intake of rescue medication.

In other words, the trial aims at evaluating:

effect of the combination of 6 viable bacterial strains (Composition 1, according to the present invention) on abdominal symptoms in non-constipated patients suffering from irritable bowel syndrome (IBS);

relief of IBS symptoms;

daily consistency of the faeces;

overall satisfaction with the treatment;

quality of life;

psychological impairment;

intake of rescue medication;

composition of the gut microbiota and metabolic products (metabolomics)—and, therefore, modifications at the level of the gut microbial ecosystem;
intestinal permeability;
recovery of strains in faeces;
modifications of the inflammatory pathway.

The possibility of analysing microbiota in blood will be considered as an exploratory objective for the purposes of the trial.

2. Experimental Design

Multicentre, randomised, double-blind, parallel group, placebo-controlled trial.

The estimated recruitment period will be approximately 12 months.

Patients will be recruited after signing informed consent prior to any other trial procedure and after evaluating the inclusion/exclusion criteria.

6 trial visits, each of which will be conducted according to the requirements reported in the protocol (see FIG. 1), will be scheduled for each subject.

Trial visits will be conducted as follows: at Visit 0 (screening), at Visit 1 (baseline/beginning of 1st treatment period), at Visit 2 (end of 1st treatment period/start of wash-out), at Visit 3 (end of wash out/beginning of 2nd treatment period), at Visit 4 (end of 2nd treatment period) and at Visit 5 (end of trial).

Subjects will be recruited at the screening visit and they will enter a 1-week screening period.

Thus, if eligible, they will be subjected to a randomising procedure at the baseline visit and they will be randomly assigned to a treatment group (Composition 1/placebo or placebo/Composition 1). Each subject will be provided with the active product (Composition 1) or the placebo for 4 weeks; after a 4-week wash-out period, each subject will enter the second treatment period for another 4 weeks. After visit 4 (end of treatment), patients will enter a four-week follow-up phase until the end of trial visit (visit 5).

Each subject will take 1 sachet of the active product (Composition 1) or Placebo once a day for 4 weeks.

Thus, two treatment sequences can be identified:
Sequence 1 (E-P): patients treated with Composition 1 (E) in the first treatment period and Placebo (P) in the second.
Sequence 2 (P-E): patients treated with Placebo (P) in the first treatment period and Composition 1 (E) in the second.

3. Patients

Male or female patients≥18 years and ≤65 years of age, diagnosed with IBS without constipation (see below) according to Rome IV criteria.

The diagnostic criterion for IBS, met for the previous 3 months with onset of symptoms at least 6 months prior to diagnosis, is recurrent abdominal pain at least 1 day per week, associated with 2 or more of the following:

1) Related to defecation;
2) Associated with the change in stool frequency;
3) Associated with the change in the form (appearance) of faeces;

Patients with IBS without constipation include:

1) IBS with predominant diarrhoea (IBS-D): more than one-quarter (25%) of bowel movements in the form of faeces (Bristol) type 1 or 2;
2) IBS with mixed bowel habits (IBS-M): more than one-quarter (25%) of bowel movements in the form of faeces (Bristol) type 1 or 2 and more than one-quarter (25%) of bowel movements in the form of faeces (Bristol) type 6 or 7.

4. Inclusion Criteria

≥18 and ≤65 years of age.
Positive diagnosis of IBS without constipation (IBS-D and IBS-M, both male and female) according to the Rome IV criteria.
Colonoscopy conducted within 5 years prior to the screening visit if the patient is at least 50 years of age negative, or if the patient has one of these alarm signals:

1) has a significant recorded weight loss in the last 6 months; or
2) shows symptoms at night; or
3) has a family history of colon cancer; or
4) has blood mixed with faeces (excluding blood from haemorrhoids).

Further relevant screening or consultations, where appropriate, negative.
Ability to comply with the trial protocol.

5. Exclusion Criteria

Patients suffering from IBS-C or IBS-U according to the Rome IV criteria.
Presence of any relevant organic, systemic or metabolic disease (particularly significant history of cardiac, renal, neurological, psychiatric, oncological, endocrinological, metabolic or hepatic diseases), or abnormal laboratory values detected during the run-in period, considered clinically significant based on predefined values (e.g. renal or hepatic function levels 2 times higher than the highest reference values).
Established organic bowel diseases, including food allergies or inflammatory bowel diseases (Crohn's disease, ulcerative colitis, diverticular disease, infectious colitis, ischemic colitis, microscopic colitis).
Previous major abdominal surgery.
Active malignancy of any type, or history of malignancy (patients with a clinical history of other neoplasms that have been surgically removed and that have no evidence of relapse for at least five years prior to trial recruitment are acceptable).
Untreated food intolerance as established.
Suspected lactose intolerance, as defined by the anamnestic evaluation or, where appropriate, lactose breath test.
Use of probiotics or topical/systemic antibiotic therapy over the last month.
Frequent or systematic use of contact laxatives.
Pregnant women or women of reproductive age in the absence of effective contraceptive methods.
Inability to comply with the Protocol.
Treatment with any experimental drug within the previous 30 days.
Recent history or suspicion of abuse of alcohol or drug addiction.
Presence of red or white flags according to the Rome IV criteria.
Psychosocial Alarm Questionnaire for Functional gastrointestinal Disorders.

6. Treatment

Composition 1 according to the present invention comprises: *Lactobacillus casei* DG®, *Lactobacillus plantarum* LpIBS01, *Bifidobacterium breve* BbIBS01, *Bifidobacterium breve* BbIBS02, *Bifidobacterium animalis* sub. *lactis* BlIBS01, *Bifidobacterium bifidum* BbfIBS01=MIMBb23sg), 1 dose (capsule or sachet) per day for 4 weeks (approximately $30\times10^9$ CFU/dose, approximately $5\times10^9$ CFU for each bacterial strain).

Composition 2 (placebo), indistinguishable from Composition 1, one capsule/sachet per day for 4 weeks.

7. Randomisation

Recruitable patients will enter a 1-week run-in phase and then at Visit 1 they will be randomly assigned with a 1:1 ratio to the treatment with Composition 1 (composition according to the invention) or to the bacteria-free equivalent product (Placebo), similar in colour and flavour, once a day for 4 weeks. The clinical trial design with the run-in, treatment, cross-over, treatment and follow-up phases are reported in FIG. 1.

8. Endpoints

Primary Endpoint

Evaluation of changes in faecal microbiota with respect to the baseline in terms of microbial diversity indices (α and β diversity), relative taxonomic abundance and metabolites.

Secondary Endpoints

1. Relief from IBS symptoms, evaluated by means of IBS symptom severity scale (IBS-SSS) score, evaluated at V1, V2, V3, V4 and V5;

2. Evaluation of the daily abdominal pain/discomfort evaluated by means of the standard 11-point numerical rating scale (NRS) (from 0=none to 10=worst possible pain);

3. Evaluation of the frequency and consistency of daily faeces as evaluated by the Bristol Stool Form Scale (BSFS);

4. Change of intestinal permeability (blood sample), with evaluation of zonulin serum, citrulline and PV-1 levels through the ELISA test;

5. Detection of the strains present in Composition 1 in stool samples using qPCR specific primers;

6. Overall satisfaction for the treatment evaluated by means of VAS scale;

7. Evaluation of the quality of life evaluated by means of the Short-Form 12 Items (SF-12) validated health survey on a 0 to 100 scale;

8. Change of the intake of rescue medications.

Safety Endpoints

9. Collection of adverse events of patients with IBS and serious adverse events during the trial;

10. Concomitant medications during the trial.

Exploratory Endpoint

Evaluation of changes in blood microbiota with respect to the baseline in terms of microbial diversity indices (α and β diversity), relative taxonomic abundance.

9. Population for analysis and statistical considerations

Full Analysis Set (FAS): consists of all randomised patients.

Safety set: consists of all randomised patients who receive at least one trial treatment dose and have at least one post-baseline safety assessment.

Protocol Set (PP): consists of all randomised patients who complete the trial without any significant violation of protocol.

Intention to Treat Set (ITT): consists of all randomised patients who receive at least one trial treatment dose and have at least one post-baseline efficacy assessment.

The primary endpoint of the trial will be descriptively compared between the two trial arms (Composition 1 and Placebo). An appropriate inferential analysis will be carried out solely for exploratory purposes.

In general, all variables will be descriptively analysed as concerns the treatment arm and visit (mean, median, standard deviation, minimum and maximum for continuous variables after control of distribution normality by means of Kolmogorov-Smirnov test, frequency distribution for categorical variables). All analyses will be detailed in the Statistical analysis plan (SAP) which will be finalised in version 1.0 prior to the Data Base Lock (DBL). In detail, safety and tolerability data will include (at least) physical examinations, vital signs, laboratory data and adverse events.

The invention claimed is:

1. A method comprising administering as a medicament to a subject with irritable bowel syndrome (IBS) a composition comprising a mixture M comprising:

*Bifidobacterium bifidum* MIMBb23sg DSM 32708;

and at least one bacterial strain selected from the group consisting of:

*Bifidobacterium breve* BbIBSO1 DSM 33231;

*Bifidobacterium breve* BbIBS02 DSM 33232;

*Bifidobacterium animalis* subsp. *lactis* BlIBSO1 DSM 33233;

*Lactobacillus plantarum* LpIBSO1 DSM 33234;

or mixtures thereof;

said composition optionally further comprising at least one food or pharmaceutical grade additive and/or excipient.

2. A method comprising administering as a medicament to a subject with irritable bowel syndrome (IBS) a composition comprising a mixture M comprising:

*Bifidobacterium bifidum* MIMBb23sg DSM 32708;

and at least one bacterial strain selected from the group consisting of:

*Bifidobacterium breve* BbIBSO1 DSM 33231;

*Bifidobacterium breve* BbIBS02 DSM 33232;

*Bifidobacterium animalis* subsp. *lactis* BlIBSO1 DSM 33233;

*Lactobacillus plantarum* LpIBSO1 DSM 33234;

or mixtures thereof;

said composition optionally further comprising at least one food or pharmaceutical grade additive and/or excipient, and wherein each bacterial strain of the composition is at a concentration from $1\times10^6$ CFU to $1\times10^{12}$ CFU.

3. The method according to claim 2, wherein said mixture M comprises bacterial strains:

*Bifidobacterium bifidum* MIMBb23sg DSM32708, *Bifidobacterium breve* BbIBS01 DSM 33231, *Bifidobacterium breve* BbIBS02 DSM 33232, *Bifidobacterium animalis* subsp. *lactis* BlIBS01 DSM 33233, and *Lactobacillus plantarum* LpIBS01 DSM 33234.

4. The method according to claim 2, wherein said mixture M further comprises at least one bacterial strain selected from the group B consisting of: *Lactobacillus casei* CNCM I-1572, and *Lactobacillus paracasei* DSM26760.

5. The method according to claim 2, wherein said mixture M consists of bacterial strains: *Bifidobacterium bifidum* MIMBb23sg DSM 32708, *Bifidobacterium breve* BbIBS01 DSM 33231, *Bifidobacterium breve* BbIBS02 DSM 33232, *Bifidobacterium animalis* subsp. *lactis* BlIBS01 DSM 33233, *Lactobacillus plantarum* LpIBS01 DSM 33234, and *Lactobacillus casei* CNCM I-1572.

* * * * *